United States Patent
Hagen et al.

(10) Patent No.: US 8,331,585 B2
(45) Date of Patent: Dec. 11, 2012

(54) AUDIO MIXING

(75) Inventors: Roar Hagen, Stockholm (SE); Niklas Enbom, Stockholm (SE)

(73) Assignee: Google Inc., Mountain View, CA (US)

( * ) Notice: Subject to any disclaimer, the term of this patent is extended or adjusted under 35 U.S.C. 154(b) by 1323 days.

(21) Appl. No.: 11/798,140

(22) Filed: May 10, 2007

(65) Prior Publication Data
US 2007/0274540 A1    Nov. 29, 2007

Related U.S. Application Data

(60) Provisional application No. 60/799,683, filed on May 12, 2006.

(30) Foreign Application Priority Data

May 11, 2006 (EP) ..................................... 06113826

(51) Int. Cl.
*H04B 1/00* (2006.01)
*H04B 1/20* (2006.01)
*H04M 3/42* (2006.01)
(52) U.S. Cl. ..................... 381/119; 369/4; 379/202.01
(58) Field of Classification Search .................. 381/119, 381/17–19, 77, 22–23; 379/202.01; 369/4
See application file for complete search history.

(56) References Cited

U.S. PATENT DOCUMENTS

| | | | |
|---|---|---|---|
| 5,647,008 A * | 7/1997 | Farhangi et al. ............. | 381/119 |
| 6,931,134 B1 * | 8/2005 | Waller et al. ................. | 381/27 |
| 7,006,617 B1 | 2/2006 | Dal Farra et al. | |
| 7,643,436 B2 * | 1/2010 | Provino et al. ............... | 370/260 |
| 2002/0072684 A1 * | 6/2002 | Stearns ........................ | 600/528 |
| 2002/0085697 A1 | 7/2002 | Simard et al. | |
| 2006/0067500 A1 | 3/2006 | Christofferson et al. | |

FOREIGN PATENT DOCUMENTS

| EP | 0995191 B1 | 4/2000 |
|---|---|---|
| EP | 1113657 A2 | 7/2001 |
| EP | 1298903 A2 | 4/2003 |

OTHER PUBLICATIONS

Chinese Office Action for corresponding application No. 200780022591.0 dated Jul. 14, 2011.
European Search Report for Application No. 11169701.7-1224, dated Jul. 12, 2011.
European Office Action for Application No. 11169701.7-1224, dated Apr. 23, 2012.

* cited by examiner

*Primary Examiner* — Yuwen Pan
*Assistant Examiner* — George Monikang
(74) *Attorney, Agent, or Firm* — Birch, Stewart, Kolasch & Birch, LLP

(57) ABSTRACT

The invention relates to a method and an apparatus for mixing audio signals. The invention is based on the idea to base selection of what audio channels to mix on the dynamic behavior of the audio channels in terms of whether they are active or not, rather than basing the selection on quantative measures of the audio channels. According to the invention, a set of audio channels are arranged in a mixing stack and a mixed audio signal is produced from the topmost channels above a predetermined threshold level in the stack. Whenever a channel becomes active, it is placed at the top of the stack.

34 Claims, 4 Drawing Sheets

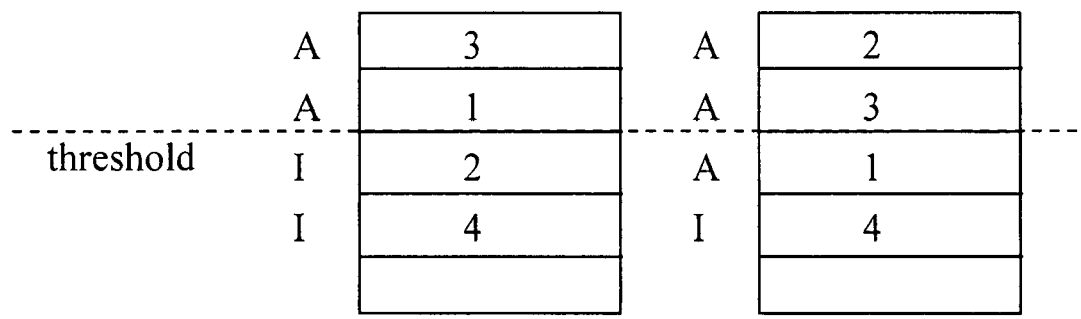
*FIG. 2a*  *FIG. 2b*
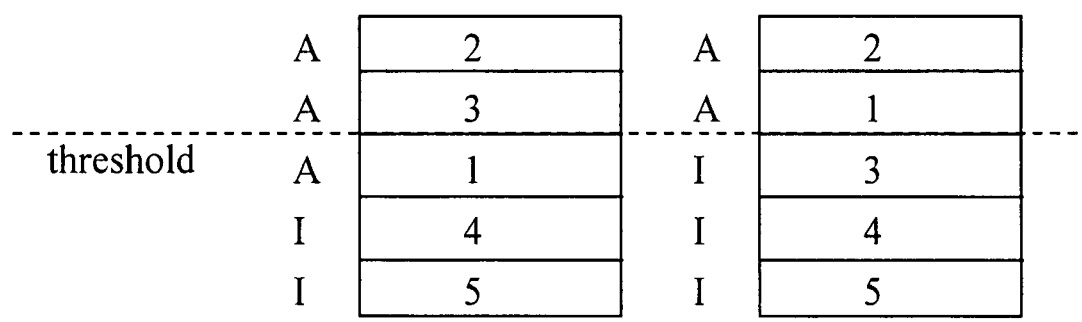
*FIG. 3a*  *FIG. 3b*
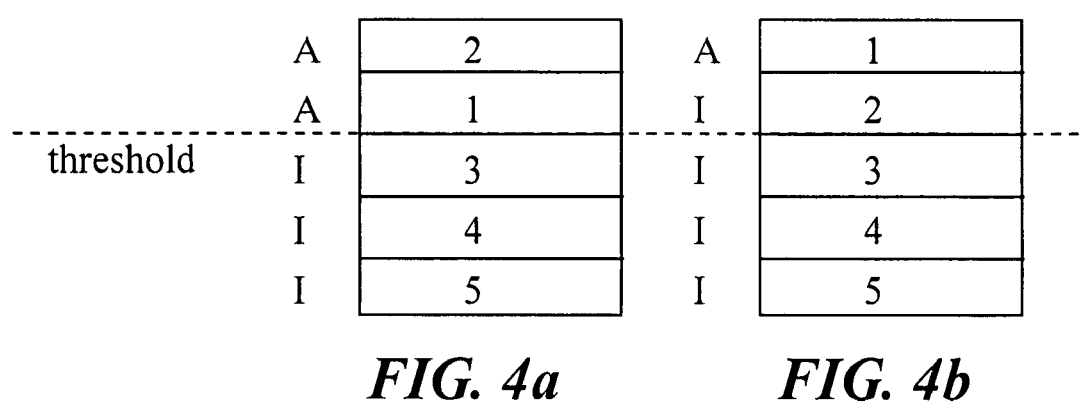
*FIG. 4a*  *FIG. 4b*

AUDIO MIXING

This Nonprovisional application claims priority under 35 U.S.C.§119(e) on U.S. Provisional Application No(s). 60/799,683 filed on May 12, 2006 and under 35 U.S.C. §119 (a) on European Application No(s). 06113826.9 filed on May 11, 2006, the entire contents of which are hereby incorporated by reference.

TECHNICAL FIELD OF THE INVENTION

The present invention relates to a method of mixing audio signals and an audio mixing apparatus designed to operate in accordance with such a method.

TECHNICAL BACKGROUND AND PRIOR ART

In an audio conferencing system, several participants are connected to a conference bridge. The conference bridge will handle admission control of participants, conference control functions etc. When an audio conference is ongoing, the conference bridge performs media processing in order to receive audio signals from the participants, mix the audio signals to a total signal that will be transmitted to the participants (with the exception that its own signal will be subtracted to avoid echo).

In general, a conferencing system should be scalable, i.e. the hardware that runs the conference bridges should be able to handle several conferences and a great number of participants at the same time. The usual behavior in an audio conference is however that a maximum of 2 or 3 people talk at the same time. Also, the number of people that are allowed to talk at the same time needs to be limited in order for the conference to be meaningful for a listener. Therefore, the logic for controlling the mixing of the audio signals is advantageously designed such that a certain maximum number of active participants is allowed at the same time for a specific conference. The resulting total mixed audio signal will be calculated from these active participants. An active participant will receive this total mixed signal after its own signal has been subtracted to avoid that the participant hears his own voice. All other participants will receive and hear the total mixed signal. In this manner only a few distinct signals need to be transmitted. This saves complexity both in mixing and encoding.

Further, it is desirable to maximize the number of audio channels to mix, even if the current number of active participants are low. This is because mixing of too many channels, of which some only contain background noise, will degrade quality, as it will degrade the signal to noise ratio of the resulting mixed signal.

The present invention addresses the problem of how to select audio channels when mixing the corresponding audio signals to a resulting mixed audio signal.

EP 0 995 191 discloses mixing of multiple concurrent audio streams. Each stream comprises a sequence of frames and a subset of specific frames to be mixed is selected from the concurrent frames. The selection involves ranking the concurrent frames in order of importance and then selecting the most important frames. The ranking is based on a quantity inherent in each of the concurrent frames, such as its energy content. Selection can also be based on a combination of energy content and priorities assigned to the respective streams.

One problem with this prior art is the difficulty for a new audio stream to be included in the mix of audio streams. For example, consider a speech conference in which a new user wants to participate. If the audio stream of the new user is not allocated a high enough ranking, due to its low energy content or due to the low priority of its audio stream, other audio streams having higher ranking will prevent the new participant from easily joining the conference.

Another problem with the above described prior art is that such a scheme for mixing audio streams in certain common situations will result in an annoying switching behaviour in the background noise. This problem will be output signal. This will result in a more natural mixed output signal, due to the absence of unnecessary changes of inactive channels to be mixed. This can be compared with a system in which a certain criteria determines what channels to mix, e.g. an energy criteria. In such a system an inactive channel will often be changed for another inactive channel due to, e.g., a higher energy content of the background noise of the latter, or some other criteria better fulfilled by the latter inactive channel. This in turn will result in annoying switching behaviour in the background noise of the mixed output signal. Alternatively, such a system may choose not to include the inactive channel at all in the mixed output signal, which also will result in a less natural mixed output signal.

Preferably, when an active audio channel becomes inactive, that channel is moved below the active channels in the stack. As a result any active channel which was located just below the threshold level will then become part of the mixed output signal, as it will move one position up in the stack and be positioned above the threshold level. Again, if the mixing stack has more channels above the threshold level than the number of currently active channels, the channel that has become inactive will still be part of the mixed output signal, and any unnecessary switching behaviour in the background noise will be avoided.

Even though one apparent application of the present invention is a speech conference system, the skilled person will appreciate that the idea behind the present invention, as well as its implementation, is suitable for any application where there is a need to select what audio channels to mix among a multiple number of audio channels, such channels conveying speech, music or any other kind of audio, and then obtain a mixed audio signal to be output to a desired destination, such as to a loudspeaker, a recording device, back to one or more of more fully understood upon study of the following disclosure of the present invention.

SUMMARY OF THE INVENTION

An object of the present invention is to alleviate some of the problems of prior art schemes for selecting audio channels to be mixed.

The invention achieves this object by providing a method for mixing audio signals in accordance with claim 1 and an audio mixing apparatus for audio mixing in accordance with claim 9.

The present invention is based on the idea to base selection of what audio channels to mix on the dynamic behaviour of the audio channels in terms of whether they are active or not, rather than basing the selection on quantative measures of the audio channels.

According to the invention, a set of audio channels are arranged in a mixing stack and a mixed audio signal is produced from the topmost channels above a predetermined threshold level in the stack. Whenever a channel becomes active, it is placed at the top of the stack. This has the advantage that whenever an audio channel becomes active, it will be part of the mixed audio output signal, irrespective of its ranking in the system. In a speech conference application, this means that a new user can easily join an ongoing conference, without having to rely on, e.g., his ranking by the system among the different users.

Another advantage of the present invention is that annoying switching behaviour in the background noise in some situations will be avoided. In a situation when a channel changes from active to inactive, and there are not enough active channels to "push" that inactive channel below the threshold level, i.e. there are currently less active channels than the number of channels to mix, the background noise of the channel that just became inactive will still be part of the mixed the audio sources etc. Thus, the present invention should not be interpreted as being limited to speech conference systems or to speech channels.

Further features of the invention, as well as advantages thereof, will become more readily apparent from the following detailed description of a number of exemplifying embodiments of the invention. As is understood, various modifications, alterations and different combinations of features coming within the scope of the invention as defined by the appended claims will become apparent to those skilled in the art when studying the general teaching set forth herein and the following detailed description.

BRIEF DESCRIPTION OF THE DRAWINGS

Exemplifying embodiments of the present invention will now be described with reference to the accompanying drawings, in which:

FIGS. 2-4 show exemplifying operations on a mixing stack in accordance with the invention;

DETAILED DESCRIPTION OF PREFERRED EMBODIMENTS

Figure 1:
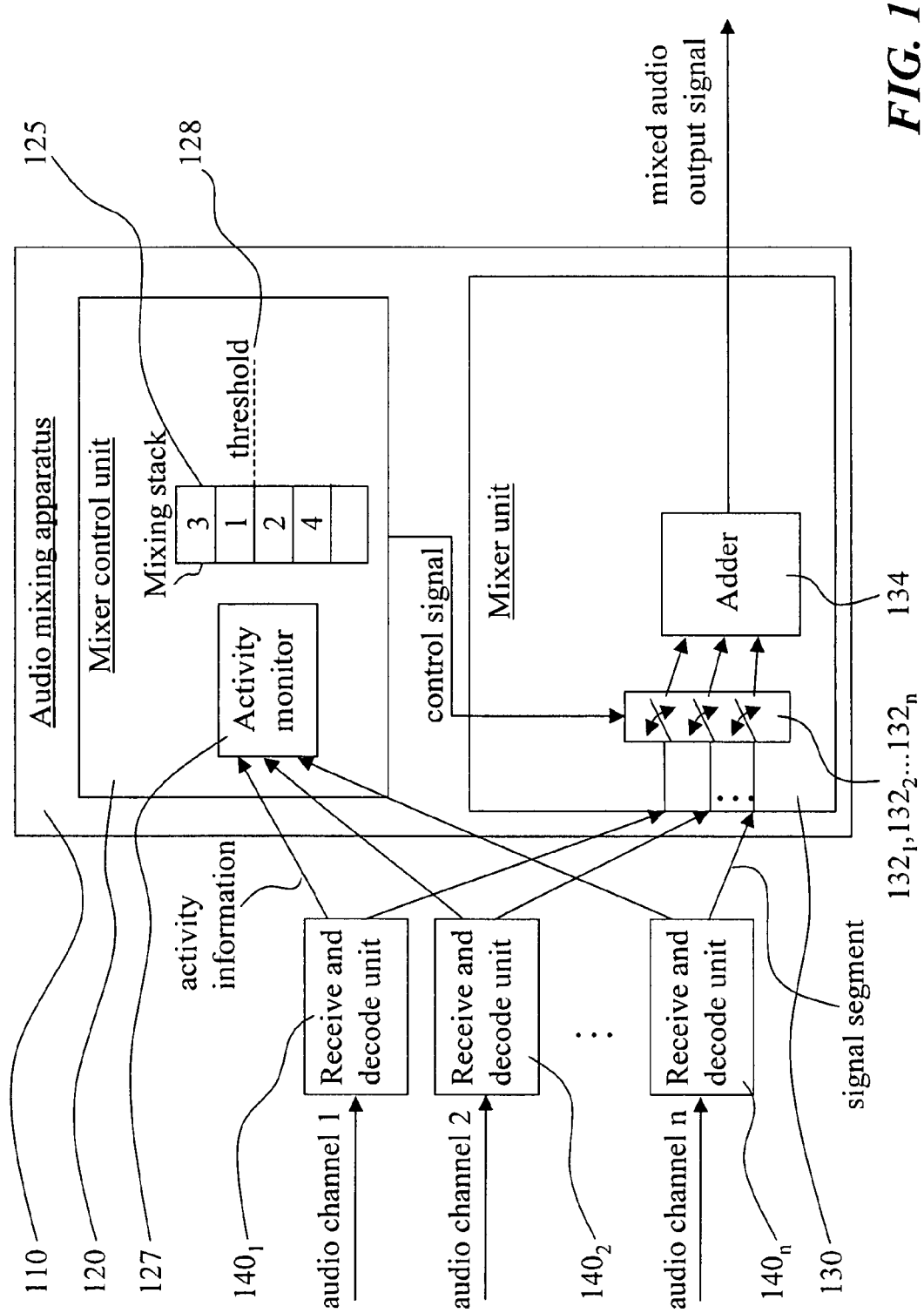
FIG. 1 shows an exemplifying audio mixing apparatus having a structure and operation in accordance with the invention.

FIG. 1 schematically shows an exemplifying audio mixing apparatus 110 having a structure and operation in accordance with the invention.

The audio mixing apparatus 110 includes a mixer control unit 120 and a mixer unit 130. The mixer control unit 120 includes, or is operably connected to, a mixing stack 125 and an activity monitor 127. The mixing stack includes a number of levels and each level is capable of storing a channel identifier. The mixing stack can also be regarded as a list with channel identifiers. The activity monitor is responsible for monitoring activity information received for all channels that potentially should be mixed by the mixing apparatus 110. The mixer control unit 120 is operably connected to the mixer unit 130 in order to be able to provide control information to the same. Connected to the audio mixing apparatus 110 is a set of receive and decode units $140_1, 140_2 \ldots 140_n$ which provide activity information to the mixer control unit 120 and signal segments to the mixer unit 130.

An exemplifying mode of operation of the audio mixing apparatus 110 in FIG. 1 will now be described. At the left hand side, a set of audio channels 1, 2 . . . n is received by the respective receive and decode units $140_1, 140_2 \ldots 140_n$. Typically, the audio channels provide the audio signals as audio packets with segments of the audio signals. The receive and decode units will decode the received audio packets using any state of the art decoder which is suitable for the purpose, as will be appreciated by the skilled person. Preferably, each receive and decode units $140_1, 140_2 \ldots 140_n$ is configured to detect audio activity on its respective channel and forward activity information to the mixer control unit 120. Further, each receive and decode units $140_1, 140_2 \ldots 140_n$ will forward segments of its respective decoded audio signal to the mixer unit 130.

The detection of audio activity can be performed in a number of different ways. For example, it can be based on an energy criteria indicating an audio activity above a certain background noise level. Further, as an alternative to being made by the receive and decode units $140_1, 140_2 \ldots 140_n$, the detection could be made by some other entity within, or connected to, the audio mixing apparatus 110. It should be noted that the described detection at the audio mixing apparatus also can be based on what kind of information that is received over audio channel, in which case the actual determination of audio activity has been made remotely, typically at the audio source. In a speech conference application, the voice activity detection can e.g. be made, either at the audio source or at the audio mixing apparatus, in accordance with the voice activity detection, VAD, procedure described in the granted U.S. Pat. No. 6,993,481.

The activity monitor 127 of the mixer control unit 120 monitors received activity information for all the audio channels. Based on the activity information for the channels, the mixer control unit manages the mixing stack 125 by storing and relocating audio channel identifiers at the various levels of the mixing stack.

The management of the mixing stack is as follows. When the activity monitor 127 determines that an existing inactive channel in the stack has become active, it removes the corresponding channel identifier from its current level in the stack and pushes the channel identifier into the mixing stack from the top, in turn pushing all channel identifiers that previously was above the removed channel identifier one level down in the stack. When the activity monitor determines that an existing active channel in the stack has become inactive, it removes the corresponding channel identifier from its current level in the stack and inserts the channel identifier of the now inactive channel at the first level below other channel identifiers of channels that are still active. Examples of different stack management operations will be described below with reference to FIGS. 2-4.

As shown in FIG. 1, the mixing stack has a predetermined threshold level 128. The channel identifiers above the threshold identify what channels that are to be mixed to a mixed audio output signal. The location of this threshold is predetermined in dependency of the desired number of received audio channels to mix onto the audio output signal. The location of the threshold in FIG. 1 between the second and the third level in the mixing stack, resulting in that two received audio channels should be mixed to a mixed audio output signal, is a mere example, and the threshold could equally well be located such that three or more received audio channels are mixed to an audio output signal. In FIG. 1 the location of the threshold level will result in that the audio channels 3 and 1 are the channels that currently should be mixed to a mixed audio output signal.

The storing and relocation of channel identifiers in the mixing stack 125, i.e. the updating of the mixing stack, is performed regularly with a time interval corresponding to the time length of one or more signal segments of the audio signals provided by the audio channels. In a speech conference application, the mixed speech output signal should be produced segment by segment. Thus, if a speech signal segment e.g. has the length of 10 ms, the mixing stack should be updated every 10 ms in order to control which received speech signal segments that should be mixed to a mixed speech output signal segment.

With the same regularity as the mixing stack 125 is updated by the mixer control unit, the mixer control unit 120 controls the mixer unit 130 by means of a control signal. This control signal will control switches $132_1, 132_2 \ldots 132_n$ such that the audio signals identified by the channel identifiers that are above the threshold level in the mixing stack are connected to the adder circuit 134. In the exemplified situation in FIG. 1, the control signal will control switches $132_1$ and $132_3$ such that audio signal segments of audio channels 1 and 3 are connected through to adder circuit 134. Adder circuit 134 will add received signal segments to produce a mixed audio output signal segment. The adder circuit 134 may be configured to scale received signals before performing the adding operation. This could be advantageous if the different signals have different energy, so that no signal is suppressed by any other signal in the mixed output signal. For example, in a speech conference application it is often desired that all currently active speakers can be heard with approximately the same intensity.

FIGS. 2-4 show exemplifying management operations of a mixing stack 125.

FIGS. 2a and 2b illustrate stack management when an inactive channel becomes active. In FIG. 2a there are 4 channels connected to the audio mixing apparatus, channels 3, 1, 2 and 4. This could e.g. correspond to 4 registered participants in a speech conference. Before the mixing stack of FIG. 2a is updated, channels 3 and 1 are active (indicated with an A), and channels 2 and 4 are inactive (indicated with an I). Channels 3 and 1 are both above the threshold. Therefore, the control signal from the mixer control unit 120 will control switches $132_1, 132_2 \ldots 132_n$ so that segments of channels 3 and 1 are added by adder circuit 134 of mixer unit 130 to produce a segment of the mixed audio output signal.

If channel 2 now becomes active, the mixing stack will be updated to a content illustrated with FIG. 2b, i.e. channel 2 will be moved to the top of the stack, pushing channel 1 below the threshold. The control signal from the mixer control unit 120 will now control switches $132_1, 132_2 \ldots 132_n$ so that segments of channels 2 and 3 now are added by adder circuit 134 of mixer unit 130 to produce a segment of the mixed audio output signal. Thus, before the mixing stack was updated, channels 3 and 1 were mixed to form the audio output signal, and after the update, channels 2 and 3 will be mixed to form the audio output signal. Thus, even though channel 1 is still active after the update of the mixing stack, it is located below the threshold and will not be included in the mix of signals that form the mixed audio output signal.

FIGS. 3a and 3b illustrate stack management when a channel is added to the audio mixing apparatus and when a channel becomes inactive. In FIG. 3a a channel 5 is added. As channel 5 initially is inactive it is added at the lowest level in the stack. The control signal from the mixer control unit 120 will control the mixer unit 130 such that respective segments of channels 2 and 3 are mixed to form a segment of the audio output signal.

If channel 3 now becomes inactive, the mixing stack is updated in accordance with FIG. 3b, i.e. channel 3 is moved below the still active channels 2 and 1 in the stack. Channel 1 will thus now be located above the threshold, and the control signal from the mixer control unit 120 will control the mixer unit 130 such that respective segments of channels 2 and 1 are mixed to form a segment of the audio output signal.

FIGS. 4a and 4b illustrate another example of stack management when a channel becomes inactive. The mixing stack of FIG. 4a results in respective segments of channels 2 and 1 being mixed to form a segment of the audio output signal. If channel 2 becomes inactive, the mixing stack is updated in accordance with FIG. 4b, i.e. channel 2 is moved below the still active channel 1 in the stack. As channel 2 is still at a level in the stack which is above the threshold, its segment will be mixed with the segment of channel 1 to produce a segment of the mixed audio output signal, even though channel 2 has ceased to be active.

Figure 5:
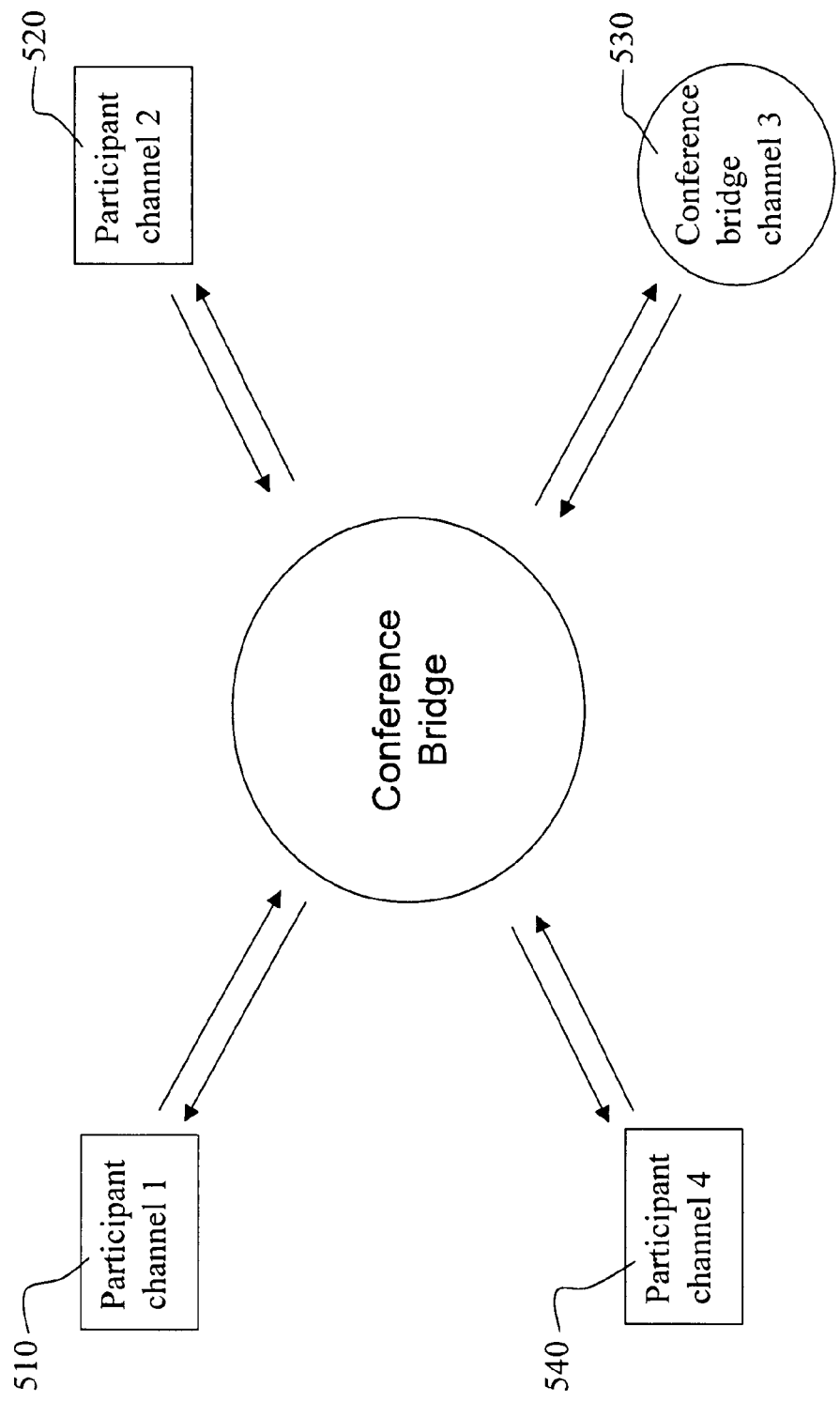
FIG. 5 shows a conference bridge which suitably may be implemented by an audio mixing apparatus according to the present invention.

FIG. 5 schematically shows a conference bridge 500 which may be implemented by an audio mixing apparatus according to the present invention. The conference bridge 500 is used to implement an audio conference system, typically a speech conference system, to which a number of participants 510, 520, 530, 540 are connected. Each participant corresponds to a channel and each channel is bidirectional, or alternatively implemented as a channel pair, since each participant both is an audio source as well as a destination of a resulting mixed audio signal. A participant is typically a user taking part in a conference, but can also be another entity, such as another conference bridge 540 as illustrated in FIG. 5. The channels may suitably be implemented by IP (Internet Protocol) connections or some other packet based connections. Thus, a conference bridge is according to the present disclosure to be understood as a device which interconnects a number of audio sources such that audio can be received from the sources, undergo a mixing at the conference bridge, and resulting mixed audio signals be transmitted back to the sources.

Figure 6:
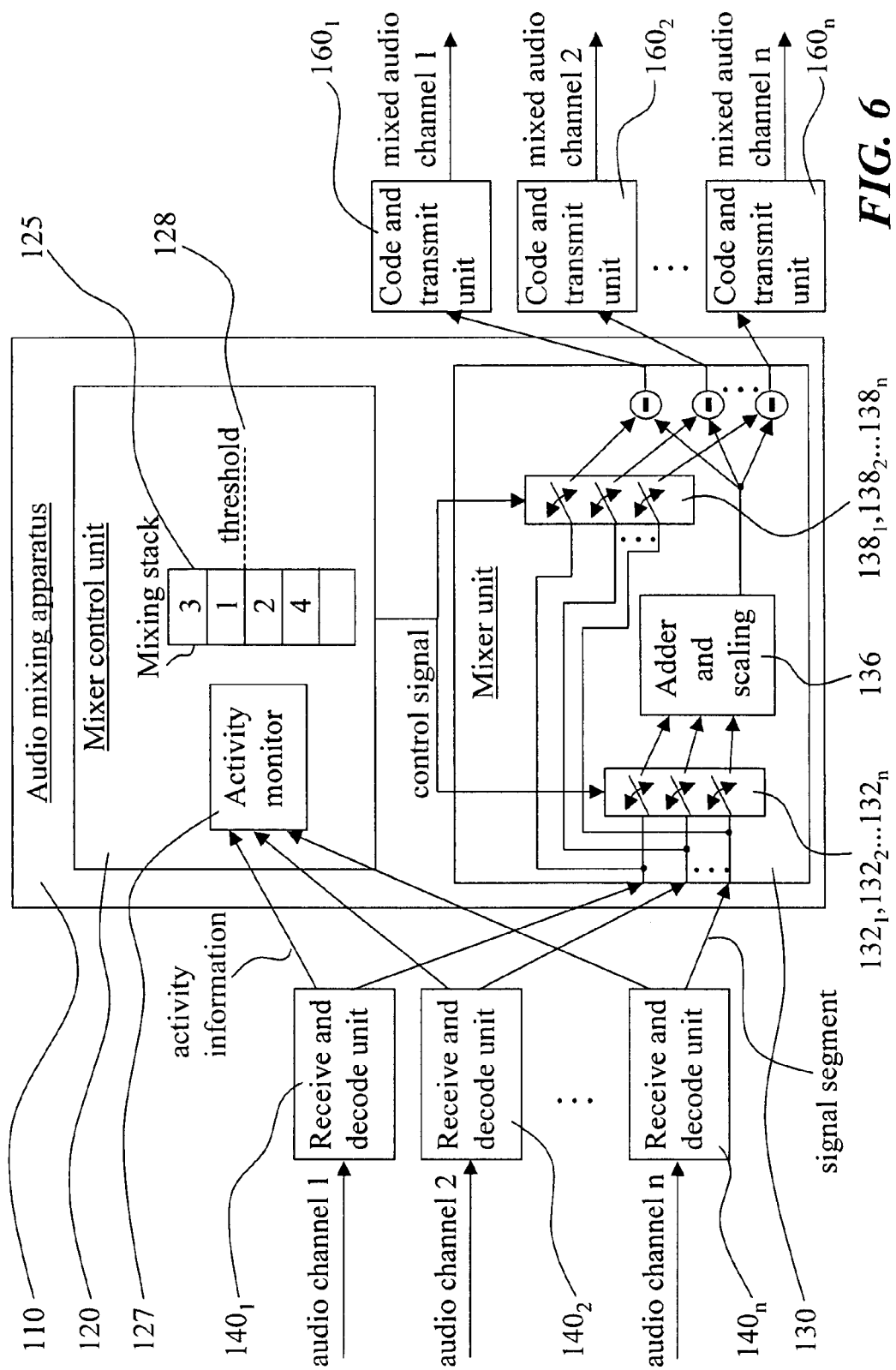
FIG. 6 shows an embodiment of an audio mixing apparatus implementing the conference bridge of FIG. 5 in greater detail.

FIG. 6 shows an embodiment of an audio mixing apparatus which suitably may implement the conference bridge of FIG. 5. The structure and operation of the audio mixing apparatus of FIG. 6 correspond to that described above with reference to FIG. 1 apart from the following modification. In a speech conference system, each conference participant should be a destination of the resulting mixed audio output signal. However, the speech input by such a conference participant should not be included in the mixed audio output signal transmitted back to the participant. If this was the case, the participant would hear his own voice from the loudspeaker of the conference system. Therefore, modifications need to be made in order to produce and transmit the mixed audio output signal in an appropriate way.

With regard to producing the mixed audio output signal, modifications are made as discussed below. With regard to transmitting the mixed audio output signal, a set of code and transmit units $160_1, 160_2 \ldots 160_n$ are connected to the audio mixing apparatus 110 for coding and transmitting mixed audio output signals on respective channels 1, 2, . . . n. Typically, the code and transmit units will transmit audio signals as audio packets with segments of the audio signals. Each code and transmit unit is responsible for coding a mixed output signal to audio packets using any state of the art coder suitable for the purpose.

In FIG. 6, the audio output signal is now produced with a mixer unit that has been modified as compared to the mixer unit of FIG. 1. The modification concerns that the control signal from the mixer control unit now also control a second set of switches $138_1, 138_2 \ldots 138_n$. Also, the adder circuit 134 of FIG. 1 has been replaced by a adder and scaling circuit 136, since a speech conference system in general will require scaling of the audio sources with regard to energy content prior to adding the sources to a mixed output signal. As discussed with reference to FIGS. 1-4, the control signal may e.g. control switches $132_1, 132_2 \ldots 132_n$ such that respective segments of channels 2 and 3 are mixed to form a segment of the audio output signal. With the switches $138_1, 138_2 \ldots 138_n$, the same control signal at the same time controls the mixed audio output signal such that the segment of channel 2 is subtracted from the mixed audio output signal before forwarding the same to a code and transmit unit for channel 2, and the segment of channel 3 is subtracted from the mixed audio output signal before forwarding the mixed audio output signal to a code and transmit unit for channel 3.

The invention claimed is:

1. A method of mixing at least two audio signals included in a set of audio signals provided by a set of respective audio channels, the method including:
    arranging the set of audio channels in a mixing stack using their respective channel identifiers, wherein one channel identifier, corresponding to one of the audio channels, is stored at each level of the stack;
    regularly updating the mixing stack such that a channel identifier corresponding to an audio channel which previously was active but now has become inactive is relocated below the channel identifiers corresponding to active audio channels; and
    producing a mixed audio output signal by mixing audio signals provided by the audio channels corresponding to a predetermined number of topmost channel identifiers stored in the mixing stack,
    wherein if the relocated channel identifier is one of the predetermined number of topmost channel identifiers stored in the mixing stack, the audio signal provided by the corresponding inactive audio channel is part of the mixed audio output signal.

2. The method as claimed in claim 1, wherein the step of regularly updating the mixing stack includes updating the mixing stack such that a channel identifier corresponding to an audio channel which previously was inactive but now has become active is relocated to the top of the mixing stack.

3. The method as claimed in claim 1, wherein a channel is determined to be active or inactive based on monitoring of activity on that channel.

4. The method as claimed in claim 1, wherein the step of regularly updating the mixing stack is performed with a time interval corresponding to the time length of one or more signal segments of the mixed audio output signal.

5. The method as claimed in claim 1, wherein the predetermined number of topmost channel identifiers stored in the mixing stack is two.

6. The method as claimed in claim 1, wherein the predetermined number of topmost channel identifiers stored in the mixing stack is three.

7. The method as claim in claim 1, wherein the audio channels are speech channels to be mixed during a speech conference.

8. The method as claimed in claim 1, wherein at least one audio channel to be mixed corresponds to a mixed audio signal received from a conference bridge of an audio conferencing system.

9. An audio mixing apparatus for mixing at least two audio signals included in a set of audio signals provided by a set of respective audio channels, the apparatus including:
    a mixing stack in which the set of audio channels are arranged using their respective channel identifiers, wherein one channel identifier, corresponding to one of the audio channels, is stored at each level of the stack;
    a mixer control unit for regularly updating the mixing stack such that a channel identifier corresponding to an audio channel which previously was active but now has become inactive is relocated below the channel identifiers corresponding to active audio channels; and
    a mixer unit for producing a mixed audio output signal by mixing audio signals provided by the audio channels corresponding to a predetermined number of topmost channel identifiers stored in the mixing stack,
    wherein if the relocated channel identifier is one of the predetermined number of topmost channel identifiers stored in the mixing stack, the audio signal provided by the corresponding inactive audio channel is part of the mixed audio output signal produced by the mixer unit.

10. The audio mixing apparatus as claimed in claim 9, wherein the mixer control unit further is adapted for regularly updating the mixing stack such that a channel identifier corresponding to an audio channel which previously was inactive but now has become active is relocated to the top of the mixing stack.

11. The audio mixing apparatus as claimed in claim 9, wherein the mixer control unit includes an activity monitor which, for each channel, is adapted to monitor activity information for the channel and determine if the channel is active or inactive.

12. The audio mixing apparatus as claimed in claim 9, wherein the mixer control unit is adapted to regularly update the mixing stack with a time interval corresponding to the time length of one or more signal segments of the mixed audio output signal.

13. The audio mixing apparatus as claimed in claim 9, wherein the predetermined number of topmost channel identifiers stored in the mixing stack is two.

14. The audio mixing apparatus as claimed in claim 9, wherein the predetermined number of topmost channel identifiers stored in the mixing stack is three.

15. The audio mixing apparatus as claimed in claim 9, adapted to mix audio channels in the form of speech channels.

16. The audio mixing apparatus as claimed in claim 9, wherein at least one audio channel to be mixed corresponds to a mixed audio signal received from another audio mixing apparatus.

17. A conference bridge in an audio conferencing system, the conference bridge including an audio mixing apparatus as claimed in claim 9.

18. The conference bridge as claimed in claim 17, wherein at least one audio channel to be mixed corresponds to a mixed audio signal received from another conference bridge.

19. The method as claimed in claim 2 wherein a channel is determined to be active or inactive based on monitoring of activity on that channel.

20. The method as claimed in claim 2, wherein the step of regularly updating the mixing stack is performed with a time interval corresponding to the time length of one or more signal segments of the mixed audio output signal.

21. A method of mixing audio signals provided by a set of audio channels, the method including:
    storing channel identifiers for the set of audio channels in a mixing stack such that one channel identifier, corresponding to one of the audio channels, is stored at each level of the mixing stack;
    receiving, for each of the audio channels, audio activity information indicating whether the audio channel is active or inactive;
    updating the mixing stack for selection of audio channels to mix based on the audio activity information received for the audio channels; and
    producing a mixed audio output signal by mixing audio signals provided by the audio channels corresponding to the channel identifiers stored above a predetermined threshold level in the updated mixing stack, wherein the updating is performed such that a channel identifier corresponding to an audio channel that previously was active but, based on the audio activity information received for the audio channel, now has become inactive, is relocated below the channel identifiers corresponding to the active audio channels, and wherein if the relocated channel identifier is above the predetermined threshold level, the audio signal provided by the corresponding inactive audio channel is part of the mixed audio output signal.

22. The method as claimed in claim 21, wherein the step of updating the mixing stack includes updating the mixing stack such that a channel identifier corresponding to an audio channel which previously was inactive but, based on the audio activity information received for the audio channel, now has become active is relocated to the top of the mixing stack.

23. The method as claimed in claim 21, wherein a channel is determined to be active or inactive based on monitoring of activity on that channel.

24. The method as claimed in claim 21, wherein the step of updating the mixing stack is performed with a time interval corresponding to the time length of one or more signal segments of the mixed audio output signal.

25. The method as claimed in claim 21, wherein the number of channel identifiers stored above the predetermined threshold level is two or three.

26. The method as claimed in claim 21, wherein the audio channels are speech channels to be mixed during a speech conference.

27. The method as claimed in claim 21, wherein at least one audio channel to be mixed corresponds to a mixed audio signal received from a conference bridge of an audio conferencing system.

28. An audio mixing apparatus for mixing audio signals provided by a set of audio channels, the apparatus including:

a mixing stack in which channel identifiers for the audio channels are stored such that one channel identifier, corresponding to one of the audio channels is stored at each level of the mixing stack;

a mixer control unit configured to receive, for each of the audio channels, audio activity information indicating whether the audio channel is active or inactive, and update the mixing stack based on the audio activity information received for the audio channels; and a mixer unit for producing a mixed audio output signal by mixing the audio signals provided by the audio channels corresponding to the channel identifiers stored above a predetermined threshold level in the updated mixing stack, wherein the mixer control unit is configured to update the mixing stack such that a channel identifier corresponding to an audio channel that previously was active but, based on the audio activity information received for the audio channel, now has become inactive is relocated below the channel identifiers corresponding to the active audio channels, and wherein if the relocated channel identifier is above the predetermined threshold level, the audio signal provided by the corresponding inactive audio channel is part of the mixed audio output signal.

29. The audio mixing apparatus as claimed in claim 28, wherein the mixer control unit is further configured to update the mixing stack such that a channel identifier corresponding to an audio channel which previously was inactive but, based on the audio activity information received for the audio channel, now has become active is relocated to the top of the mixing stack.

30. The audio mixing apparatus as claimed in claim 28, wherein the mixer control unit includes an activity monitor which, for each channel, is adapted to monitor activity information for the channel and determine if the channel is active or inactive.

31. The audio mixing apparatus as claimed in claim 28, wherein the mixer control unit is adapted to regularly update the mixing stack with a time interval corresponding to the time length of one or more signal segments of the mixed audio output signal.

32. The audio mixing apparatus as claimed in claim 28, wherein the number of channel identifiers stored above the predetermined threshold level is two or three.

33. The audio mixing apparatus as claimed in claim 28, wherein at least one audio channel to be mixed corresponds to a mixed audio signal received from another audio mixing apparatus or a conference bridge.

34. A conference bridge in an audio conferencing system, the conference bridge including an audio mixing apparatus as claimed in claim 28.

* * * * *